United States Patent Office 3,613,475
Patented Oct. 19, 1971

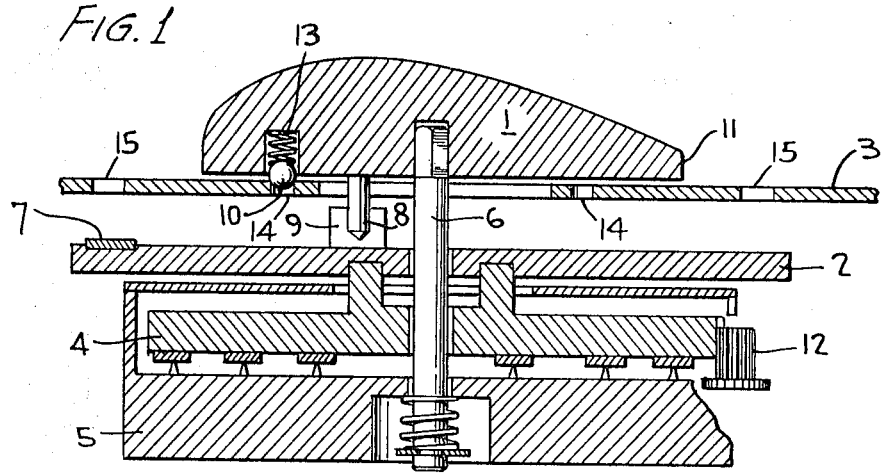
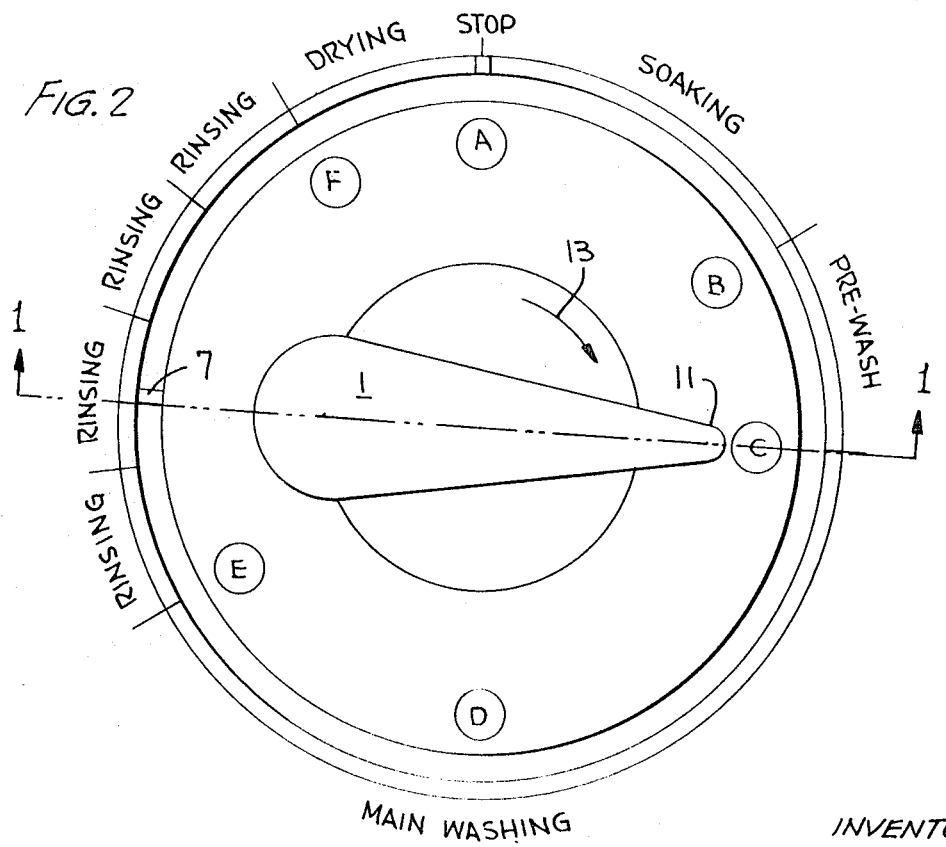

3,613,475
DEVICE FOR THE PRESELECTION OF A PROGRAM
Walter Holzer, Meersburg, Germany, assignor to Holzer Patent AG, Zug, Switzerland
Filed Feb. 12, 1970, Ser. No. 10,958
Claims priority, application Germany, Feb. 15, 1969, P 19 07 725.9
Int. Cl. H01h 43/14; G05g 1/00
U.S. Cl. 74—491         3 Claims

ABSTRACT OF THE DISCLOSURE

This invention relates to a device for the preselection of a program and for the recording of the flow of said program of automatic cycle mechanisms, especially for the use in washing machines and dishwashers.

---

Preselection and recording devices for automatic cycle mechanisms have been known. One of these known arrangements, German Utility Pat. No. 1,873,118, makes use of separate recording fields for the preselection of the program and the program positions. Besides, this arrangement contains a separate device for program selection. Expenditure for such a control unit is considerable and is not justified any longer in the case of present-day mass production. Another known control arrangement uses only one turning knob, single knob operation, for the preselection of the programs and the recording of the program positions which in each case have been run through. This installation is disadvantageous in that the operating knob moves away from the present program when the machine has been put in motion so that later on, one can no longer check which program really had been set. Furthermore, this solution has the disadvantage that the operating knob which is firmly connected with the program cam disk or the program cam roller can only show the rest positions which are inherent in the automatic cycle mechanism.

It is an object of the invention to provide a device for the preselection of a program and recording of the flow of a program of automatic cycle mechanism, which avoids the disadvantage of the known previously mentioned solutions and with which it is possible using the least possible number of individual parts, to control even during the flow of the program, which program had been selected. Beyond that, preferred stop locations should be possible independently of the stop positions of a program cam disk or roller and the strength of the stop should be as great as desired. A driving motor for the program disk or roller should not be encumbered with the resistance of the stop arrangement. According to the invention this object is solved by the fact that the recording means, for example a recording disk or a shutter, which is in firm engagement with the program cam disk or roller, can be carried along by a preselection knob in case it is twisted as soon as a driver in connection with the knob directly or indirectly, for example, by its shaft, abuts against a driver, for example, a projection of the recording disk.

The invention has various advantages such as during the course of the program of the automatic cycle mechanism, the adjusting knob remains in the adjusted position while the recording disk and the program cam disk or program cam roller continue to revolve or turn.

Therefore the program set prior to completion of the washing program can be controlled at any time. Since the adjustment knob for the preselection of the program does not depend on the stop arrangement of the program cam disk or roller, it will be possible to provide preferred stop positions for the adjusting knob itself. Besides, the driving motor for the program cam disk or roller is not encumbered for this reason with the resistance of the catch for the recording.

One embodiment of the invention makes provisions for the knob to have a stop arrangement.

Effectively the indicator, disposed on the recording disk and the adjusting knob, are in such a relationship to one another that, in the case of the driving of the recording disk by the knob, its markings, for example its points, coincide with the indicator.

In accordance with another embodiment of the invention, a shutter with a marking opening is used instead of the indicator disposed on the recording disk.

According to a further development of the invention, the shaft of the knob for the operation of an additional switch, for example to influence the centrifugal speed or the overdrive of a washing machine, is slidable in an axial direction. According to a still further development of the invention, the shaft of the knob is connected firmly with a disk or roller of a selector switch.

Further objects will be apparent from the following description when considered in connection with the accompanying drawing in which:

FIG. 1 is a cross-section through the device according to the invention taken on line 1—1 of FIG. 2 in the direction of the arrows and, FIG. 2 is a top plan view of the adjusting and recording means.

In the present example, a program cam disk is used, FIG. 1, but the invention can be just as well used with a program cam roller. From the cross-sectional illustration, it becomes clear that a program cam disk 4, which is scanned by contact levers, can be shifted in rotation with the aid of a driving means 12, for example a gear or a feed pawl, since it runs freely on a shaft 6. The program cam disk 4 which contains the entire program, for example, of a washing machine or a dishwasher, is firmly connected with a recording disk 2. This recording disk 2 has an indicator 7 which indicates the present program position on a scale, FIG. 2, in which the program cam disk 4 or the roller just happen to be.

A knob 1 which serves for the preselection of certain programs has been attached on a shaft 6 and carries a driver 8. This driver 8 comes into engagement with a projection 9 attached to the recording disk 2. When turning the knob 1, the recording disk is carried along and driven from the moment in which the driver 8 abuts against the projection 9. The programs B, C, D, E and F, shown in FIG. 2, represent sections from an overall program A, whereby program B is the longest one and program F the shortest of the partial programs.

The driver 8 attached to the knob 1 has been attached to said knob in such a way, or else the projection 9 has been attached to the recording disk in such a way, that the indicator 7 and the marking of the knob 1, for example its point 11, coincide in the case of driving of the recording disk 2 by the knob 1. Whenever therefore, the indicator 7 is in the OFF position and the program C is to be preselected, then the indicator 7 with it the program cam disk 4 is carried along or driven up to point C. The sections from A to B and B to C have then been separated from the original total program and only the partial program from C to A is run through. If, on the other hand, one wants to turn off a program that is running, and if the indicator for example is in the position shown in FIG. 2, then it will merely be necessary to adjust the knob 1 in the direction of arrow 13 until it reaches the position OFF. As soon as point 11 of knob 1 covers indicator 7, the latter will be carried along. Whenever the knob 1 is in the position shown in FIG. 2 and the indicator 7 is on Off, and if one then for example wants to repeat the program section DRY, then it will merely be necessary to turn the knob 1 in the direction of arrow 13 up to the position OFF and from there to carry out once more a right-hand turn up to the beginning of the program section DRY. The indicator 7 in that case will be carried along by the knob 1 from the position OFF up to the beginning of the program section DRY. In the following flow of the program, the indicator 7 again moves away from point 11 of the knob up to the position DRY.

In order to be able to carry out additionally some switching functions for example, in order to stop the centrifuging program provided in the total program of a washing machine, it will merely be necessary to make the shaft 6 of the knob 1 movable in an axial direction and, as a result thereof, to operate an additional switch. Likewise, it will also be possible to connect a rotary switch to the shaft 6, in order for example to create additional preselection possibilities.

Instead of the recording disk 2 in connection with the indicator 7, one could use just as well a shutter with a marking opening which, in principle, fulfills the same purpose.

The knob 1 can be provided with a stop arrangement comprising ball 10 biased by spring 13 to engage holes 14 in housing 3. Apertures 15 enable indicator 7 to be viewed. Since the knob 1 can be brought to a stop independently of the program cam disk or roller, as many positions of the knob are possible as desired and particularly certain preferred positions. Since the driving motor which drives the program cam disk or roller does not have to overcome the resistance opposed to it by the stop arrangement of the knob 1, it is possible to provide the step-by-step switching system for the program cam disk or roller with a weaker stop arrangement than heretofore. The stop arrangement for the program cam disk or roller, according to the invention, merely needs to be positioned in accordance with the program cam disk or roller. The disadvantages which result because of a too weak or too strong a stop mechanism are eliminated.

It will also be possible to dispose several complete individual programs one behind the other on the program cam disk 4, so that in that case additional switches, for example to prevent the centrifuging, are superfluous.

I claim:
1. A device for the preselection and indication of the steps of a program for automatically operating cyclic mechanisms, comprising:

a housing;
a rotatable shaft mounted within said housing,
a cam disc having thereon means representing said program and rotatably mounted about said shaft,
a recording disc having thereon at least one upstanding projection and rotatably mounted about said shaft and fixed to said cam disc to rotate therewith,
driver means for rotating said cam disc about said shaft,
a selector knob mounted to said shaft above said recording disc, said knob including at least one downwardly extending driver element whereby rotation of said selector knob causes said at least one driver element to engage with said at least one upstanding projection to rotate said cam disc and said recording disc independently of said driver means to a pre-set position with respect to said shaft and vary said program.

2. A device as in claim 1 further comprising a detent mechanism mounted to said housing between said selectable knob and said recording disc and having therein at least one detent and apertures for viewing said recording disc, said selectable knob further including a ball biased to engage said at least one detent to retain said selectable knob in a set position with respect to said recording disc.

3. A device as in claim 1 wherein said shaft is slidably mounted in said housing to be biased in a first position and which is placed in a second position by movement of said selector knob along the axis of said shaft to provide an additional control function relating to said program.

References Cited
UNITED STATES PATENTS

| | | | |
|---|---|---|---|
| 2,662,942 | 12/1953 | Winkler | 200—167 X |
| 2,889,419 | 6/1959 | Miller et al. | 200—38 BI |
| 2,927,168 | 3/1960 | Brown | 200—167 X |
| 2,939,336 | 6/1960 | Hetzer | 200—38 B X |
| 2,969,441 | 1/1961 | Showalter. | |
| 2,976,377 | 3/1961 | Jordan | 200—38 C |
| 2,976,471 | 3/1961 | Harris | 200—38 C X |
| 3,227,821 | 1/1966 | Hauser | 200—38 C X |

J. R. SCOTT, Primary Examiner

U.S. Cl. X.R.

200—38 A, 153 L, 167 R